US 7,505,595 B2

(12) United States Patent
Lee et al.

(10) Patent No.: US 7,505,595 B2
(45) Date of Patent: Mar. 17, 2009

(54) POST CAPTURE DECRYPTION OF WIRELESSLY CAPTURED DATA USING MULTIPLE KEYSETS

(75) Inventors: Tong-Ming Lee, Cupertino, CA (US); Rodrigo Laguisma, Cupertino, CA (US); Manoj Vaddineni, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 716 days.

(21) Appl. No.: 10/713,297

(22) Filed: Nov. 14, 2003

(65) Prior Publication Data

US 2005/0071678 A1    Mar. 31, 2005

Related U.S. Application Data

(63) Continuation-in-part of application No. 10/673,698, filed on Sep. 29, 2003.

(51) Int. Cl.
*H04K 1/00* (2006.01)
*G06F 7/04* (2006.01)
*H04M 3/00* (2006.01)
*H04M 3/58* (2006.01)

(52) U.S. Cl. .......................................... 380/270; 726/4
(58) Field of Classification Search ................. 380/270; 726/4
See application file for complete search history.

(56) References Cited

U.S. PATENT DOCUMENTS

| 6,697,337 B1 | 2/2004 | Cafarelli et al. |
| 2001/0024953 A1 | 9/2001 | Balogh |
| 2003/0037033 A1* | 2/2003 | Nyman et al. ................. 707/1 |
| 2003/0120605 A1* | 6/2003 | Fontana et al. ................ 705/59 |
| 2003/0219129 A1 | 11/2003 | Whelan et al. |

FOREIGN PATENT DOCUMENTS

EP          529721 A2  *  3/1993

OTHER PUBLICATIONS

Victor A. Clincy, Nael Abu-Halaweh, "A Toxonomy of free Network Sniffers for Teaching and Research", Oct. 2005 Journal of Computing Sciences in Colleges, vol. 21 Issue 1, pp. 64-75.*
Daniel L. Lough et al., *A Short Tutorial on Wireless LANs and IEEE 802.11*, The IEEE Computer Society's Student Newsletter, vol. 5, No. 2, Summer 1997.
Christopher W. Klaus, *Wireless LAN Security FAQ*, IEEE Computer Society, Oct. 6, 2002.
Dave Molta, *Sniffer Wireless: A Traffic Analyzer in a Class of Its Own*, Network Computing, Apr. 2, 2001.
USPTO Office Action dated Arp. 6, 2007 for U.S. Appl. No. 10/673,698 Paper No. 20070319, 19 pages.

* cited by examiner

*Primary Examiner*—Emmanuel L Moise
*Assistant Examiner*—Courtney D Fields
(74) *Attorney, Agent, or Firm*—Workman Nydegger

(57) ABSTRACT

A system and method for decrypting all encrypted data packets captured from at least one of a plurality of access points in a wireless network. In the wireless network, each access point operates on its own channel, preferably using its own key or keyset. A profile is established containing all keysets for all access points. The profile is stored on the network in an encrypted form that can only be viewed through network analyzer software. The network analyzer software uses the profile to access all of the keys in use without an individual having to manually enter any key data into the analyzer software. The network analyzer can perform iterative decryption steps using all keysets in the profile until all encrypted data is decrypted.

40 Claims, 8 Drawing Sheets

POST CAPTURE DECRYPTION OF WIRELESSLY CAPTURED DATA USING MULTIPLE KEYSETS

CROSS-REFERENCE TO RELATED APPLICATIONS

This application is a continuation-in-part of United States Utility patent application Ser. No. 10/673,698, filed on Sep. 29, 2003 and entitled "Decryption Key Profiling for Wireless Network Analyzers", which is incorporated herein by reference in its entirety.

BACKGROUND OF THE INVENTION

1. The Field of the Invention

This invention is related to the field of wireless network analyzers, and more specifically to a system and method for post capture decryption of information captured using wireless network analyzers.

2. The Relevant Technology

Local Area Networks (LANs) have been in existence since the late 1960's. Initially, these networks were connected together using copper wire to transmit signals from computer to computer. In the late 1980's, the copper wire was being replaced by fiber optic cable, which transmitted signals in an optical format at much higher speeds. Development of international standards (such as the IEEE 802.3 Ethernet standard) allowed networking technology solutions to be implemented across geographical and political boundaries, regardless of the type of network or cabling used.

As computer networks became ever more complex, tools were developed to allow network administrators to more effectively manage the data traffic passing across their networks. Numerous companies have developed products such as network analyzers or "packet sniffers" which can be used to determine, for example, the density or intensity of network traffic passing across a given network node, router or switch. Knowing this information allows network administrators to reduce data bottlenecks that decrease the efficiency of, and smooth data flow through, the network. Network analyzers have become increasingly more sophisticated as technology has improved. As network speeds have increased, and the technology has progressed from wire to fiber optic cabling, the numbers and types of data packets being sent over the network have increased as well.

Unfortunately, both wire and fiber optic cable suffer from the same drawback; they require computers that are connected to the network to have a hard-wired connection before any data can be exchanged. By the mid 1990's, work was ongoing to free computers from the necessity of having a hard-wired connection to a network. Work was begun on the IEEE 802.11 Wireless Ethernet standard. Based on the particular frequency, type of modulation being used, and data speeds, the 802.11 standard has been further subdivided into 802.11a, 802.11b, and the newest 802.11g standards. In 2000, the 802.11b standard was finalized and a great deal of relatively inexpensive equipment, such as access points (APs, i.e. wireless hubs, routers or switches), and wireless Ethernet cards, was introduced in the market. The wireless Ethernet network has proven to be very popular, with sales and use of wireless technology increasing at a very rapid pace.

As with wired networks, the difficulty that network administrators face in trying to keep the large amount of network information flowing smoothly increases as the number of users, APs, and data speeds grow. Over time, network administrators realized there was a need for network analyzers that worked with wireless networks.

Unfortunately, the complexity of wireless networks requires that a new battery of tools be included within wireless network analyzers. The types of packets and other data detectable using a wired network analyzer is insufficient to allow complete analysis of wireless network traffic. The complexity associated with analyzing a network increases when the network requires secure data transmission, i.e., encrypted data propagates through the network. In order to be effective, a wireless network analyzer must be able to decrypt the transmitted data packets to verify packet integrity, routing, etc.

One example of data that is captured by a wireless network analyzer but not involved in the operation of wired analyzers is the AP channel. An AP for a wireless network is the piece of equipment (e.g., a router, hub, switch, etc.) that connects wireless clients to the network. APs can typically operate on one of 11 channels under the 802.11b standard. Any wireless client that wishes to communicate with a particular AP must use the channel that the AP is using. The wireless network analyzer must be able to detect and record this information.

Even though there are 11 channels available, a user can only connect to one AP through one AP channel. APs with overlapping coverage are operated on different channels. Because there can be some crosstalk on adjacent channels, many network administrators set all of their APs to use channels 1, 6, and 11.

The requirement to use secure data transmission between the APs and user computers complicates matters even more. Using secure data transmission is necessary because, in many cases, the information transmitted by the wireless stations extends beyond the physical boundaries of the work area, thus potentially allowing unauthorized access to the network. Encrypting all of the data to/from wireless APs alleviates this problem. To more fully understand the details of network encryption, it is necessary to understand the basics of wireless networking.

The simplest form of wireless network is two computers communicating with each other through the use of a wireless card. Each wireless card is called a station, and, as with hard-wired network cards, every card has a unique station identifier (Media Access Control, or MAC address) associated with it. A collection of stations that communicate with each other is known as a Basic Service Set (BSS). All stations in a BSS share a common set of network parameters, including a Basic Service Set ID (BSSID), a character string that identifies the BSS to each user. This network configuration is known as an independent BSS. This means that stations communicate with each other directly through use of wireless cards associated with the stations.

Another type of BSS is the infrastructure BSS. This is the most common type of small wireless network. In an infrastructure BSS, there is one AP that acts as a router/hub for all the stations connected to it. Each station sends all of its data to the AP, which in turn forwards the data either to the recipient station or the network, as appropriate. Typically, the AP operates on a single channel with all stations using the same channel. If data encryption is used, all stations use the same key or keyset. A key is an alphanumeric character string that is used to generate an encryption algorithm. A keyset is a group of keys. In wireless networking, typically four keys are included in a keyset.

A typical infrastructure BSS is shown in FIG. 1, and designated by reference numeral 8. A user group 12 of one or more independent users 12a-12n is connected to network 10 through AP 18. All users in user group 12 use the same channel 14 and keyset 16. In very small networks such as this, with only one wireless AP, controlling the keys and keysets is relatively straightforward. The system works very well for a small number of users and a single AP.

However, the primary advantage of wireless networks is that they allow users to move anywhere in a relatively large area and stay connected to the network. Wireless networks using the 802.11 standard combine multiple infrastructure BSSs into an Extended Service Set (ESS) in order to grow. All BSSs in an ESS use the same ID, which is then known as the Extended Service Set ID (ESSID). In an ESS, each station forms what is known as an association with one and only one AP. Each AP operates on its own channel so that overlapping coverage can be achieved without causing interference.

Users can move from one BSS to another within the ESS. As the user moves, the user's wireless card re-associates with the new BSS and informs the old BSS to void the previous association. As long as all APs in the ESS are using the same keyset, this movement within an ESS is transparent to the user. As far as the user is concerned, they can move around without knowing or caring which AP they are currently associated with or which channel that AP is operating on.

Communications between an AP and a user are made secure using Wired Equivalent Privacy (WEP) encryption. In a WEP-encrypted network, there are currently one to four encryption keys programmed into each user computer and AP on the network. Each computer and AP in a BSS has the same encryption keyset. Currently, these keys can be either 64 bits or 128 bits in length. Regardless of whether 64-bit or 128-bit encryption is used, each AP and user computer must be configured with an identical keyset of one to four keys in order to operate properly.

With 64-bit encryption, the key has a length of 5 characters, or 40 bits. Twenty four bits, or three characters at 8 bits per byte, are used as overhead. With 128-bit encryption, the key has a length of 13 characters, or 104 bits. The keys are often generated using random character generators. The actual size of the keys, whether 64-bit, 128-bit, or larger, and the number of keys in a particular keyset can be varied as desired based upon the level of security required in the network. This information is included here for the sake of clarity and completeness only. The present invention works with keysets using keys of any length.

In a network using 64-bit encryption, each station on the network is programmed with the same one to four 64-bit shared key(s). A station is either a wireless-enabled user computer, or any other piece of hardware connected to the wireless network and capable of sending and receiving encrypted data. When a station has encrypted data to send, it generates a random 24-bit Initialization Vector (IV) and encrypts the data to be sent with the 24-bit vector and one of its 40-bit shared keys. The entire key length is 64 bits. Not all information sent between stations is considered data, as some of the information packets transmitted between stations constitutes network management information used to maintain effective communication between devices. This non-data information is generally not encrypted.

In a network using 128-bit encryption, each station on the network is programmed with one to four 104-bit shared key(s). When a station has encrypted data to send, it generates a random 24-bit IV and encrypts the data to be sent with the 24-bit IV and one of its 104-bit shared keys. The entire key length is 128 bits. Stations send the 24-bit IV along with the encrypted data. A header field tells the receiving station which of the four shared keys is in use for the encrypted data. Receiving stations use the received 24-bit IV and their own stored 40-bit or 104-bit keys to decrypt the received data. To send and receive information within the same BSS in a WEP-encrypted network, stations must use the same encryption keys.

A typical ESS is shown in FIG. 2A. $ESS_1$ 100 includes $BSS_1$ 110, which operates through $AP_1$ 112 and uses $Keyset_1$ 114. The user can move seamlessly to $BSS_2$ 120, and the user's wireless card will automatically re-associate itself to $AP_2$ 122, as long as $AP_2$ 122 is also using $keyset_1$ 114. Any number of BSSs, characterized as $BSS_N$ 140 using $AP_N$ 142 and $Keyset_1$ 114 can be put together in this manner to cover whatever physical area is desired.

As long as all of the BSSs are part of a single ESS using a single ESSID, movement around the network will remain transparent to the user. Note that the borders between BSSs/APs in FIG. 2A are shown as dotted lines. Those skilled in the art realize that the borders between different APs are not clearly defined, and there will be many places in the physical ESS area where there is a sufficiently strong signal that a user could associate with more than one BSS/AP from a particular location. For purposes of the invention, it is not necessary to know how the wireless card associates/re-associates with a particular AP. It is sufficient to know that a user connects to only one BSS/AP at a given time. However, because of this overlapping coverage, a wireless network card in "promiscuous mode" is able to receive traffic from multiple APs and multiple stations at the same time. In promiscuous mode, the card does not communicate with or connect to the APs, it only listens and records everything it hears.

FIG. 2B shows $ESS_2$ 200, an alternative arrangement for $ESS_1$ 100 of FIG. 2A. Note that everything is the same between the two versions except that, in $ESS_2$ 200, $BSS_2$ 120 using $AP_2$ 122 is now using $keyset_2$ 126. While all of the BSSs in this example are still using the same ESSID, users attempting to move into the $BSS_2$ area will be prevented from connecting to the network unless they manually change the keyset being used on their computer. A network administrator might set up an area in this fashion to provide added security within the network, at the expense of diminished user mobility. This might be done, for example, to provide additional security to an accounting department, R&D, or executive offices for a particular company.

A large organization, particularly one with multiple office complexes located in several locations, possibly in different cities, might establish an ESSID and at least one corresponding keyset for each location. As these organizations get larger and larger, keeping the network operating smoothly becomes a more difficult and time consuming task. Any network analyzer used in such networks must be able to access data from all APs.

A network analyzer on a wireless network can operate in one of two modes; real time decryption mode and post-capture decryption mode. When the analyzer operates in real time decryption mode, the analyzer interprets the wireless packets collected by a wireless hardware device. Since the hardware device can only accept one encryption keyset from the analyzer, only the data from one BSS/AP can be decrypted. All the other data will not be interpreted correctly and therefore lost for monitoring or analysis purposes. When used in an analyzer, a wireless card is always in promiscuous mode. It monitors/captures all traffic in a selected channel. This works well when there are only a few APs in an ESS, all of which are using the same keyset, or when the network administrator has some idea of where a problem lies. This situation is shown in FIG. 2A. When monitoring any of the APs 112, 122, 132, 142, $keyset_1$ 114 is used.

This foregoing real time technique is not used when a network that uses more than one keyset needs to be monitored. Instead, decryption is disabled for the network card. The post-capture decryption mode is then used. In this mode, the network card gathers all the wireless packets it receives without trying to decrypt them. The packets are stored in a capture buffer, which is a durable data store of WLAN traffic filtered and captured in real time. The buffer can be analyzed or saved to disk and kept for later analysis. This allows for a post-capture decryption and analysis of all packets.

As many decryption keys/keysets as are required can be applied to the captured data so that all packets are correctly decoded. The number of keysets that must be available to the analyzer software can be voluminous. Unfortunately, when dealing with a very large number of ESSs, or with single ESSs having numerous BSSs, each with its own set of keys, the administrative burden of controlling the keys in the keysets becomes unwieldy.

One method available in conventional network analyzers to manage this problem is to manually enter a keyset for an AP into the analyzer software. This method works quite well for a small number of APs using one or two keysets. However, for a large number of ESSs, each potentially having multiple keysets associated with it, this method can be quite cumbersome. An individual must enter each key or keyset into the analyzer software. Since keys are not generally accepted English words, but random groupings of numbers, letters and symbols, it is quite easy to make an error when entering keys manually. A typical key for a 128 bit system might look like "3$k&jud84d1tz". Having even one character out of sequence will render the key ineffective. If the analyzer does not have the correct key for the particular AP being monitored, the analyzer will be unable to decipher the packet. Such a system is, at best, very labor intensive, and at worst, practically impossible for a network administrator to effectively manage.

The data speeds found on a typical wireless network even further complicate the task of a network analyzer. Under the 802.11b wireless ethernet standard, wireless data is transmitted at a speed of up to 11 megabits per second (Mbps). Under the 802.11g standard, this increases to 54 Mbps. Having such a large quantity of data means that data encryption/decryption must be accomplished at a very rapid pace. Even when the data is downloaded into a file and analyzed at a later time, the large volume of data, the large number of keys and the sheer number of different types of packets involved in a typical network require relatively fast decryption times. Fast decryption is very difficult to accomplish when the keys must be loaded by hand on an individual basis for every AP in the network.

One further problem encountered when dealing with large numbers of keys is determining where the keys are to be stored. Most network administrators would be hesitant to store them in unencrypted form in a file on the network, since access by third parties to the keys could be a serious security breach.

BRIEF SUMMARY OF THE INVENTION

These and other limitations are overcome by the present invention, which relates generally to the field of wireless network analyzers, and more specifically to a system and method for post capture decryption of encrypted data using decryption key profiling for wireless network analyzers. In a wireless network, each AP within an ESS operates on its own channel, possibly using its own keyset. The computer of each user will be set to the channel associated with the AP that the user is connecting to within the ESS.

One aspect of the invention is that keys are stored in keysets associated with a particular ESS, or with a particular BSS within the ESS. A keyset can include numerous keys, such as but not limited to four keys, one of which is used at any given time to encrypt and decrypt data communicated to and from the corresponding AP.

Multiple keysets can be grouped together to create a profile. The profile is then used to load a specific named keyset into the analyzer software without a user having to manually enter any key or keyset information in real time decryption mode. This allows a network administrator to analyze network traffic from different ESSs and APs without having to manually enter multiple keys or keyset information.

In one exemplary embodiment of the present invention, the engineer need only select which profile to use, and the analyzer software within the network analyzer or administrator module will apply all of the keysets in rotating order to the captured data until all of the data has been decrypted. This makes it very easy for a network administrator to move around the network with a portable computer having network analyzer software, for example, and capture data from multiple APs, and then run the analyzer software to decrypt the data using a selected profile or keyset. Since the keysets are stored in the profile, this eliminates the tedious, labor-intensive work of entering keys or keysets by hand every time an administrator wishes to monitor the APs.

Another aspect of the present invention relates to the profile being stored as an encrypted file somewhere on the network. Storing the profile as an encrypted file prevents unauthorized access to the keys, even if an intruder manages to breach network security and gain access to the data stored on the network servers or user computers. Alternatively, the profile can be stored on a personal computer hard drive, for instance a laptop belonging to the administrator.

Another aspect of the present invention is that only users with the analyzer software installed and the correct decryption sequence to access the profile can monitor network traffic. Since the profile is stored as an encrypted file, this prevents unauthorized persons outside the network from receiving the profile and gaining access to the network data and resources. It also prevents those users of the network who do not have the analyzer software installed from downloading and using the keysets stored in the profile.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EXEMPLARY EMBODIMENTS

The present invention solves the problems discussed herein by utilizing keyset profiles that eliminate the need to manually input keys into hardware devices as the user moves from Access Point (AP) to AP. A keyset profile is saved on a network or hardware device and includes all of the named keysets in use within the profile area. This keyset profile can be named with simple names that aid in reducing the difficulty with remembering numerous keysets for the particular location. For instance, a keyset profile can have a simple name associated with the particular location that is easily remembered, rather than trying to remember the complicated keyset characters that allows access to the AP(s) of that location. Even more significantly, for those organizations that work on the networks of many different companies, a single keyset profile could be used by the engineers in the organization to analyze networks of multiple entities at multiple locations.

The present invention extends to both methods and systems for providing a keyset profile having multiple keysets to facilitate access to multiple APs. The embodiments of the present invention may comprise a special purpose or general-purpose computer including computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
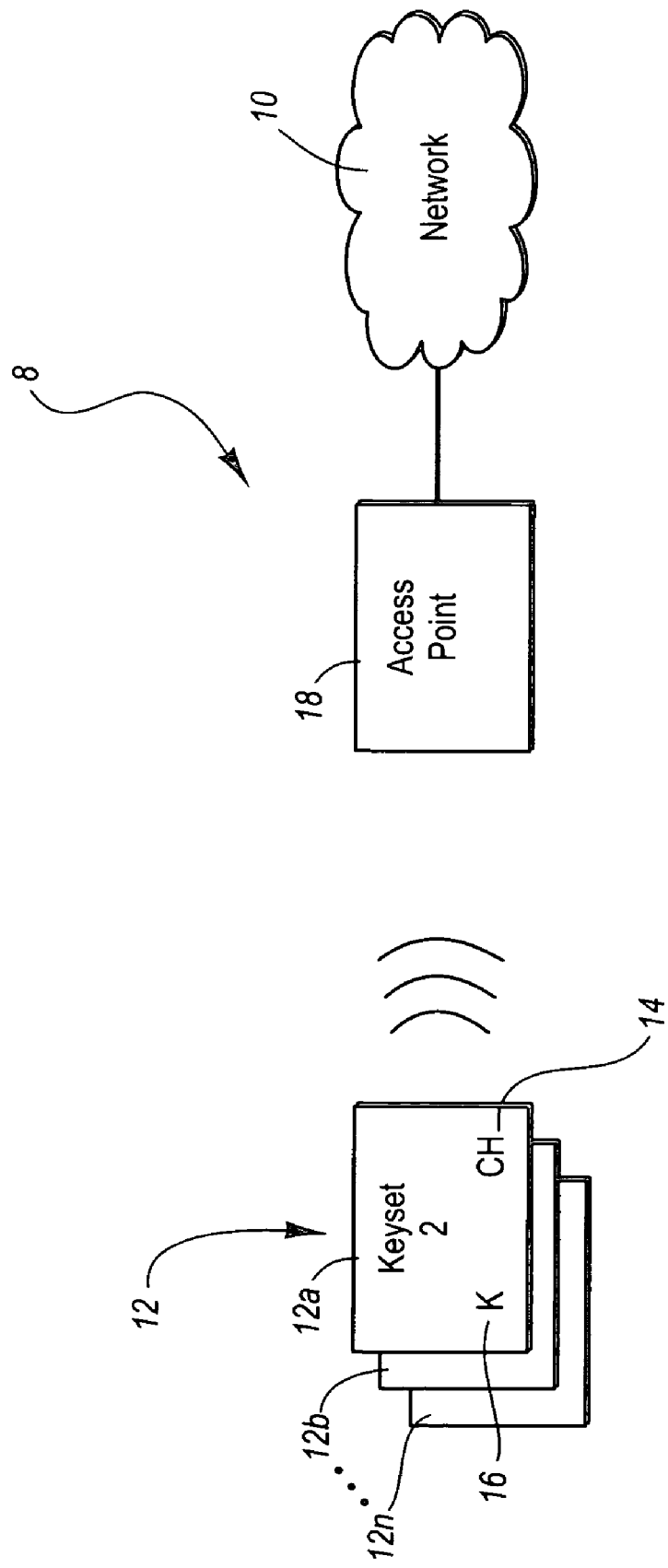
FIG. 1 illustrates a prior art block diagram of a typical small wireless network.
Figures 2A, 2B:
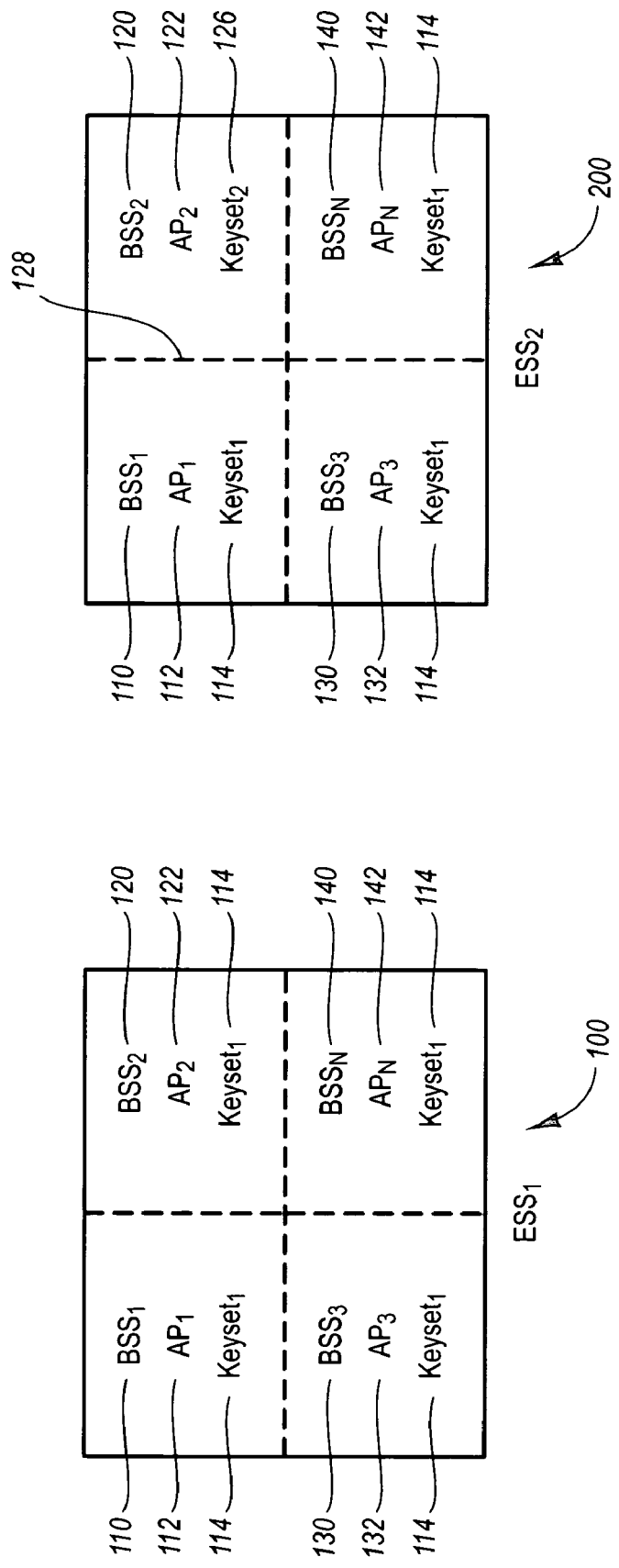
FIG. 2A illustrates one version of a typical prior art ESS configuration.
FIG. 2B illustrates a variation of the ESS configuration shown in FIG. 2A.
Figure 3:
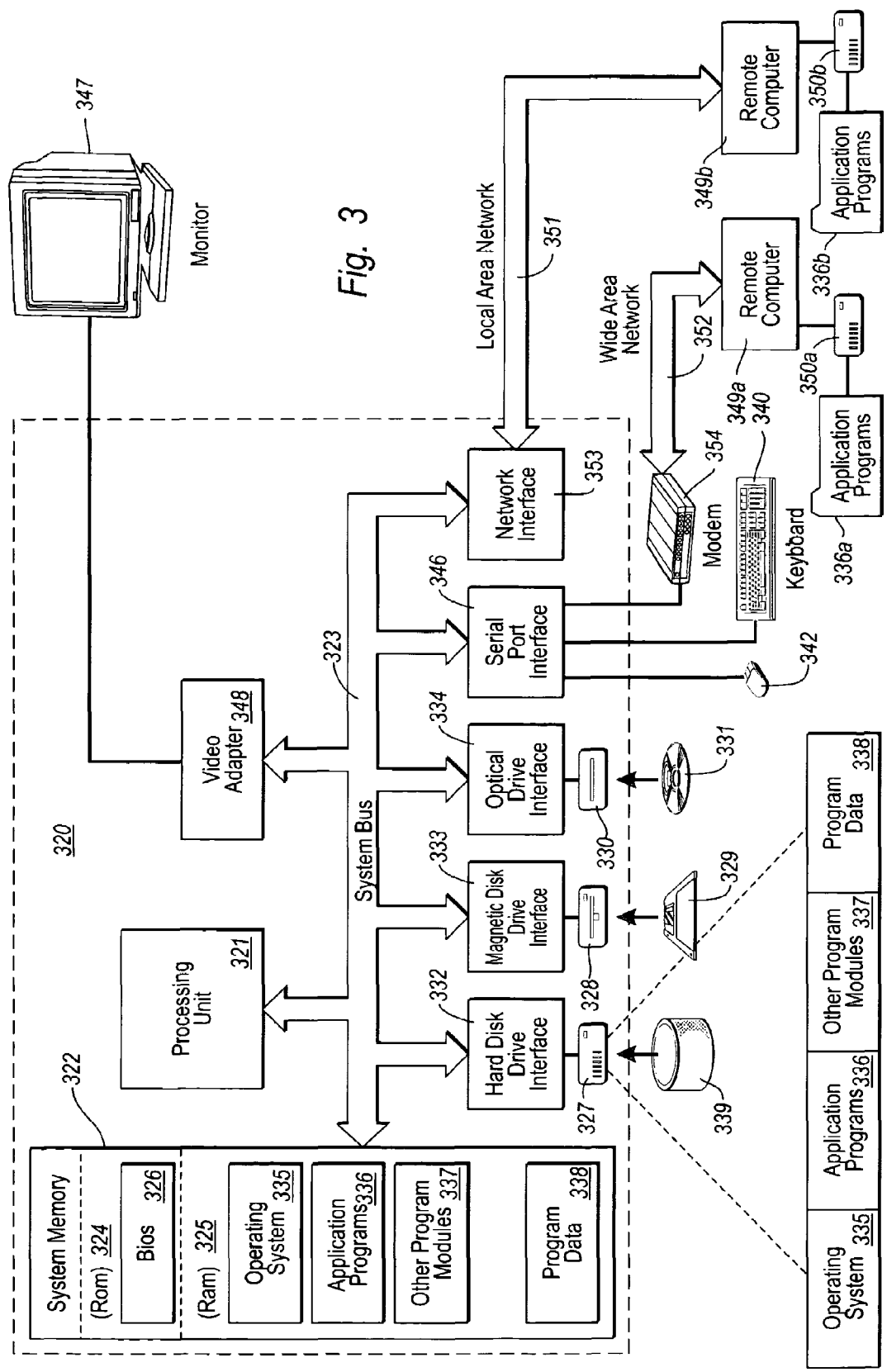
FIG. 3 illustrates an exemplary system within which the present invention can be embodied according to one aspect of the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means having one or more program modules may be stored on the hard disk 339, magnetic disk 329, optical disk 331, ROM 324, or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

Figure 4:
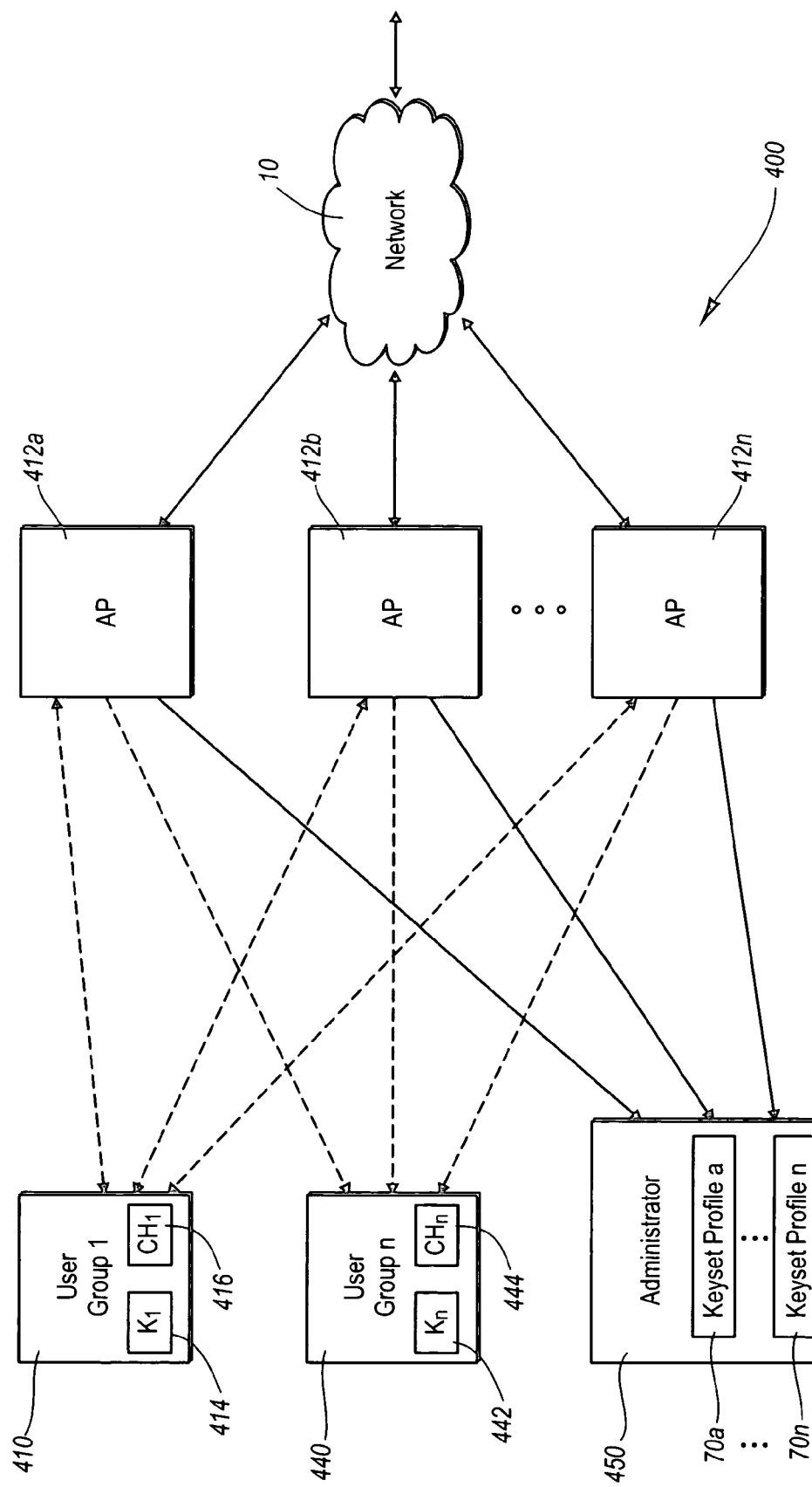
FIG. 4 illustrates another exemplary system within which the present invention can be embodied according to one aspect of the present invention.

A more detailed schematic representation of a wireless network within which computer 320 operates is illustrated in FIG. 4. The Figure shows access points (APs) 412a-412n forming part of network 400. It is understood by those with skill in the art that any number of access points could be used in this network, and the three AP's are shown by way of example only. User group$_1$, identified by reference numeral 410, can connect to any of access points 412a-412n using keyset$_1$ 414 on channel$_1$ 416, while user group$_n$, identified by reference numeral 440, can connect to any access point 412a-412n using keyset$_n$ 442 on channel$_n$ 444. It is understood by those with skill in the art that channel$_1$ corresponds to the channel that user group$_1$ 410 is using depending on which access point AP 412a-412n the user is connecting to. FIG. 4 uses dotted lines between the user groups and the access points to indicate that a particular user group or a particular user in a user group can connect to any access point depending on where they are physically located in the network and which access point is closest to them.

Keyset$_1$ 414 is used to encrypt data between user group$_1$ and whichever access point 412a-412n user group$_1$ is connected to. In the simplest version of network 400, all access points 412a-412n use the same keyset so all user groups or users in a user group are capable of moving between access points transparently. The users in user group$_1$ 410 will be able to move from access point to access point seamlessly and their wireless cards will change channels depending on which access point 412a-412n they are connecting to. As long as access points 412a-412n use the same ESSID and are encrypting data using the same keyset, users from any user group that use that ESSID and keyset will be able to seamlessly move between access points within the network. Once again it is important to note that a single user can only connect to one AP at a time, but that connection is bidirectional, meaning the data is passed back and forth between the user and that AP.

In contrast, administrator system or module 450 is shown also connected to network 400. The administrator system or module 450 utilizes keyset profiles 70a-70n. Each keyset profile 70a-70n contains one or more keys and keysets usable on network 400 or some other network that administrator system or module 450 can access. For instance, keyset profile 70a can contain all of the keys and keysets used on network 400. This allows the administrator to put his wireless network card on administrator system or module 450 into post capture decryption mode and collect information from all access points regardless of which keyset is being used to encrypt data to and from that access point in a particular user group. This is true, for instance, in cases where the administrator administers more than one wireless network in more than one location or administers multiple wireless networks in the same location each of which use different keysets or ESSIDs. In this manner, administrator system or module 450 functions as a network analyzer. Although not discussed herein, administrator system or module 450 can perform the various other functions typically associated with a network analyzer, such as, but not limited to, providing an alarm when a particular event or condition occurs.

If the administrator desires to collect real time data, an administrator listens to, for instance, access point 412a using the keyset and the channel associated with access point 412a. This allows the administrator system or module 450 to perform real time decryption of all packets that come to and from access point 412a. Alternatively, an administrator can place his wireless network access card associated with administrator system or module 450 into post capture decryption mode and retrieve information from multiple access points, for instance access points 412a and 412b, regardless of which keyset these access points are using. When administrator system or module 450 is capturing data to a data buffer in this manner, there is no communication between administrator system or module 450 and access points 412a-412n. Rather, the wireless card, associated with administrator system or module 450, collects all information from access points 412a-412b and stores that information in a data store or buffer for decryption later. The administrator 450 can select which keyset profile to apply to a particular data set.

Figure 5:
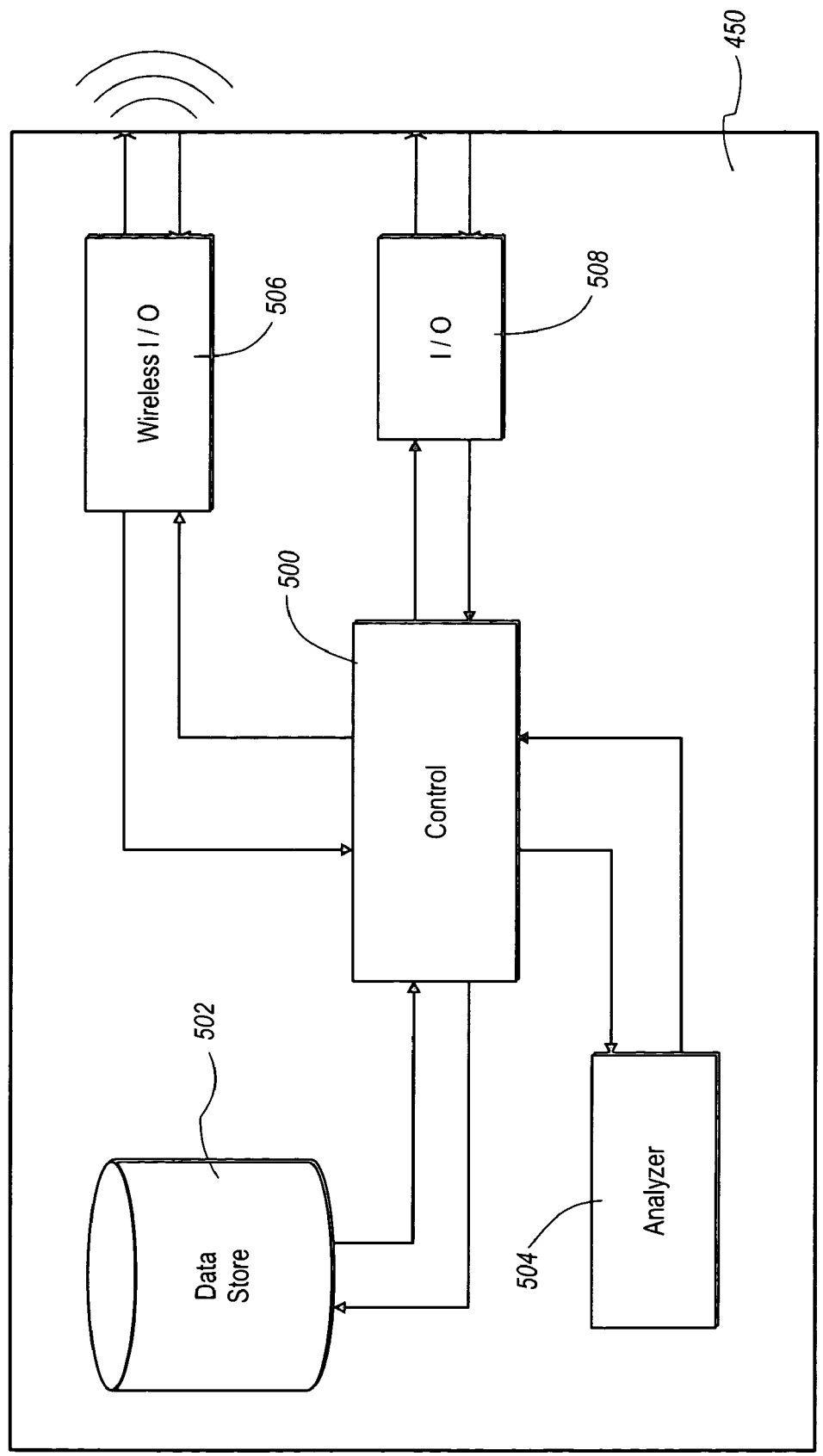
FIG. 5 illustrates a more detailed representation of an exemplary analyzer computer of the exemplary system of FIG. 4 according to another aspect of the present invention.

FIG. 5 provides a more detailed representation of administrator system or module 450. This administrator module 450 functions as a network analyzer to enable monitoring of one or more APs, capturing of data passing through the one or more APs, and decrypting the captured data. As shown, administrator system or module 450 can include various modules and software components to perform or function as a network administrator. Generally, administrator system or module 450 can include an administrator module that can perform the functions described herein with respect to FIG. 5. Alternatively, or in addition to, administrator system or module 450 can include hardware components and elements that perform the functions identified herein.

As shown in FIG. 5, administrator system or module 450 includes a controller or a control module 500. Control module 500 manages the operation of administrator system or module 450 and the software applications associated therewith. Further, control module 500 can initiate the operation of the various software components described herein. This control module 500 can incorporate processing unit 321, system memory 322, system bus 323 and elements of the architecture of computer 320 illustrated in FIG. 3.

In electrical communication with control module 500 are data store 502 and an analyzer module 504. Data store 502 represents the hardware and/or software modules and components that facilitate storage of data received by administrator system 450. For instance, data store 502 stores the encrypted data delivered or passing through access points 412a-412n (FIG. 4) retrieved by administrator system 450 and associated control module 500 and/or analyzer module 504. In addition, data store 502 stores one or more keyset profiles 70a-70n usable by analyzer module 504 to enable administrator system 450 to access the data passing through access points 412a-412n and decrypt such data. Data store 504 can be volatile or nonvolatile storage depending upon the needs and operation of administrator system 450. Further, data store 502 can be removably or fixably associated with administrator system 450.

Analyzer module 504 can decrypt the data using one or more of the key set profiles 70a-70n stored in data store 502. For instance, analyzer module 504 can retrieve, optionally under the direction of controller module 500, both collected data and encryption keys associated with key set profile 70a-70n and subsequently decrypt the data. Once this data is decrypted, the data may be analyzed to identify the data, errors in the data, or other characteristics of the data.

When a large volume of data has been saved to data store 502, analyzer module 504 is used to analyze the captured data, to identify the source of problems in the network, and to prepare the results of the network analysis to be displayed to the user. The analyzer module 504 can access one of keyset profiles 70a-70n to allow a network engineer to select a particular keyset to use, keyset$_1$, for instance. Applying this keyset to the collected data decrypts the data. Following decryption, analyzer module 504 and/or control module 502 analyze the data to verify complete decryption. When data remains encrypted, analyzer module 504 and/or control module 502 automatically, or under the direction of a user of administrator system or module 450, uses another key set to decrypt the data. This process continues until all data is decrypted.

The analyzer module 504, by providing information through a graphical user interface known to those skilled in the art, can inform the network engineer as to whether all packets have been decrypted and whether encrypted packets are still contained in the captured data. The analyzer module 504, using keyset profile$_A$, allows the network engineer to select an alternate keyset without having to manually enter the strings of characters that represent the keys. This keyset, and associated keys, can be applied to the captured data. Similarly, multiple decryption iterations can be accomplished using this technique until all of the data packets in the file have been decrypted, no matter the number of keys and keyset profiles used.

This is a great improvement in the art and a timesaver when data from multiple ESSs/BSSs using multiple keysets is being collected. The improvement is even more noticeable when an engineer analyzes network traffic from more than one network, each of which uses a different set of keys. The engineer can save a profile list for each network, and call up that profile list when the need arises to decrypt data from any particular network.

In one embodiment of the invention, the analyzer software performs iterative steps to apply all of the keys in the keyset profile until the captured data has been completely decrypted. In this embodiment, the engineer would not even have to manually select the keysets from within the keyset profile. Rather, the entire decryption process would be accomplished transparently and automatically. Once the profile was selected, data decryption would commence and continue until all data packets were decrypted, at which point the data could then be analyzed by applying all keysets in sequence until all packets are decrypted successfully. Using the decrypted results, the analyzer computes, for each packet, an integrity checksum for comparison against an Integrity Check Value to determine if the packet is decrypted successfully.

Figure 7:
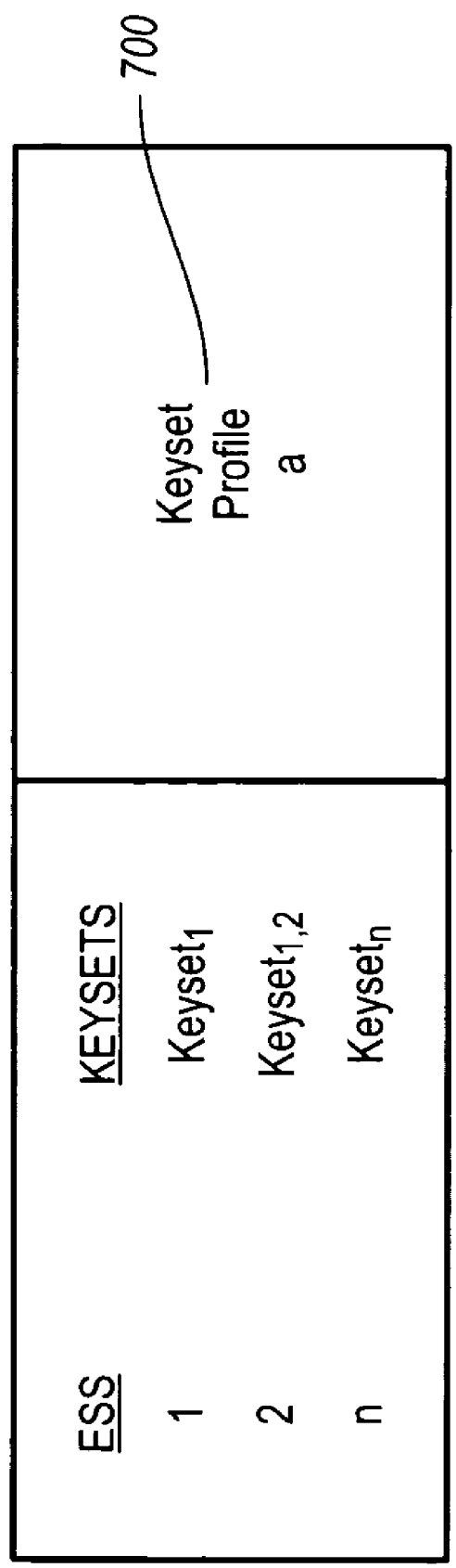
FIG. 7 shows an exemplary data structure associated with the analyzer computer of the exemplary system of FIG. 4 according to another aspect of the present invention.

An example of a keyset profile 70a is depicted in FIG. 7. As described previously, ESS$_1$ utilizes keyset$_1$, ESS$_2$ utilizes both keyset$_1$ and keyset$_2$, and ESSN uses keyset$_N$ (FIG. 4) Keyset profile$_A$ 70a includes all keys contained in keyset$_1$, keyset$_2$, and keyset$_N$. It will be appreciated by those of skill in the art that any number of keysets can be included in keyset profile$_A$ 70. Each keyset can include one or ore keys, with the illustrated keyset profile having four keys. The keyset is linked or associated with a particular BSS, ESS, or access point within an ESS in a particular wireless local area network.

Multiple profiles for multiple locations can be saved in data store 502 and accessible to analyzer module 504. After entering the keysets into the profile for the first time, the network engineer can access the saved keyset profile(s) the next time administrator system 450 with associated analyzer module 504 is to be used with the particular wireless access point. This allows a network engineer to analyze networks from many different companies using, for example, a single client computer (e.g. a laptop or PDA) operating the analyzer module or software. The information specifying the keysets, the ESSs, and wireless access points associated with the keysets, and the local area networks using the ESSs/BSSs that include the wireless access points, can be displayed through a graphical user interface, such as that shown in FIG. 6. The graphical user interface can include drop-down menus, pop-up windows, lists, tables, or other graphical user interface known to those skilled in the art.

Figure 6:
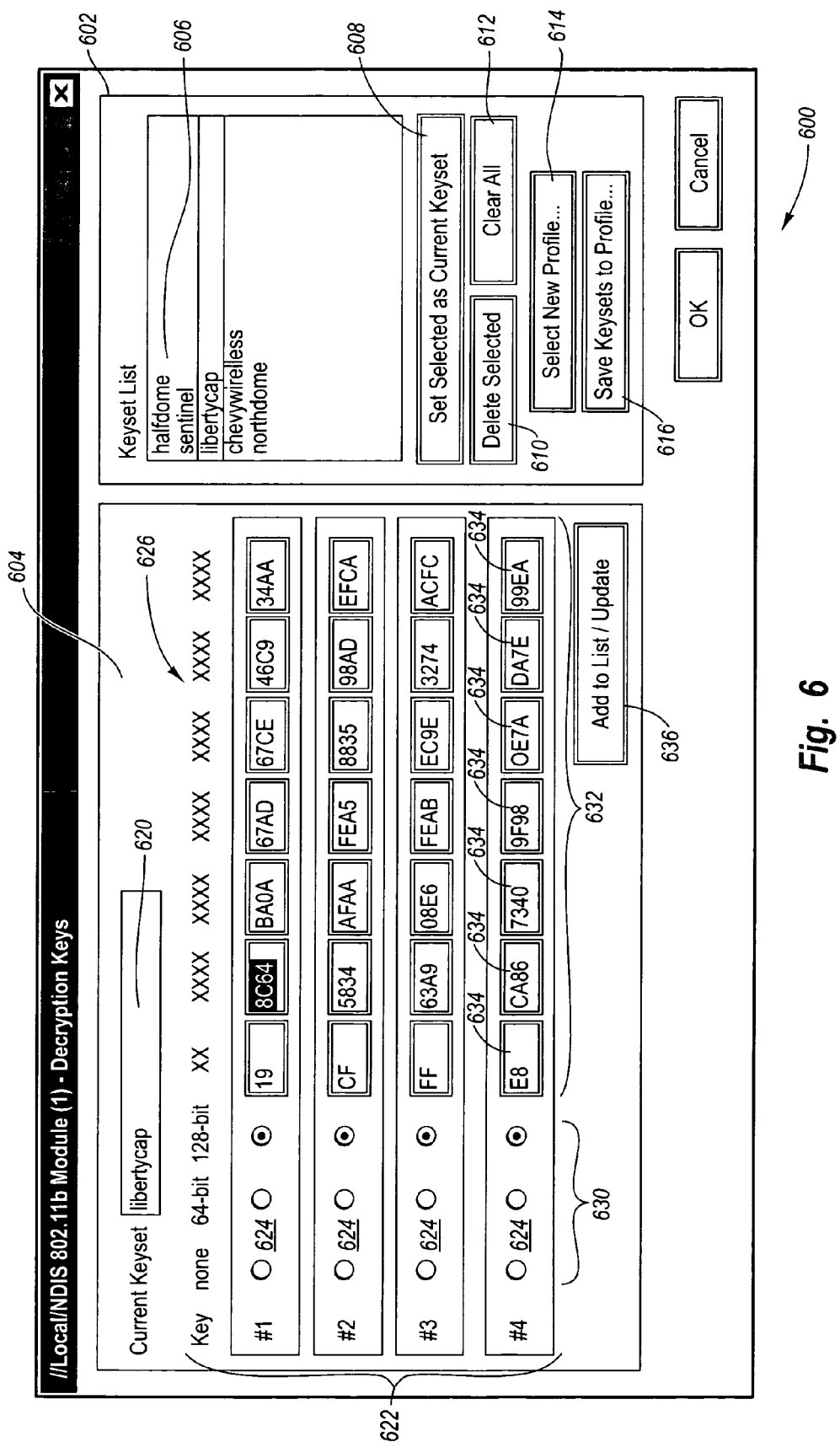
FIG. 6 shows an exemplary screen shot of an exemplary graphical user interface of the key profiling system according to another aspect of the present invention.

Using a graphical user interface, the network engineer can enter keys, modify keys, associate keysets with access points, associate multiple keysets with a keyset profile, save files, and access other keyset profiles that have been previously saved. One example of such a graphical user interface (GUI) is illustrated in FIG. 6, and shown generally as reference numeral 600. GUI 600 illustrates a selected keyset for a particular keyset profile, identified as the "//local/NDIS 802.11b Module (1)". The GUI 600 has a profile region 602 and a keyset region 604. The profile region 602 includes displays and buttons that enable a network engineer or other user of the system of the present invention to select a desired keyset profile from a list of available profiles, modify a profile through adding or deleting keys or keysets, and optionally viewing the keysets associated with a particular keyset profile. Selected keysets are displayed in the keyset region 604, including the keys associated with the keyset.

The profile region 602 includes a keyset list 606 that contains a listing of the keysets associated with a selected profile. Through selecting a particular keyset from keyset list 606, the engineer or user can select one or more keys to facilitate connecting to one or more APs. Selecting a particular keyset can be achieved through moving a cursor through the list, point and clicking upon a keyset, vocalization of the keyset's identifier, combinations thereof, or other manners by which a user can select one or more entries within a list or group. Highlighting illustrates the currently selected keyset, i.e., "libertycap". Other techniques can identify the currently selected keyset. For instance, other techniques include, but are not limited to, bolding the text designation of the keyset, moving the selected keyset to the beginning of the list, changing the color of the text designation of the keyset, combinations thereof, or other known techniques.

One or more buttons in profile region 602 aids a user in selecting or manipulating the keysets listed and depicted in keyset list 606. A set selected as current keyset button 608 enables a user to cause the information related to the keyset to be as administrator computer 450 (FIG. 5) accesses one or more APs 412a-412n. Manipulating a delete selected button 610 results in deletion of the chosen keyset within keyset list 606. Similarly, a clear all button 612 unselects a particular selected keyset in keyset list 606, thereby allowing a user to generate or create a new keyset list for the identified profile.

In addition to the above buttons, profile region 602 includes a select new profile button 614. Activating this button enables a user to either create a new profile or select an existing profile from a profile list. Achieving these functions occurs through presenting the user with one or more drop-down menus, pop-up windows, lists, tables, or other graphical user interface known to those skilled in the art that provide the user with choices as to what to call the new profile, which profiles are available, or other actions known to those skilled in the art.

Similarly, a save keyset to profile button 616 facilitates adding one or more keysets to the keyset list for a keyset profile. Again, this function occurs through presenting the user with one or more drop-down menus, pop-up windows, lists, tables, or other graphical user interface known to those skilled in the art that enable a user to define or select a keyset and add the keyset to a particular keyset profile.

Turning to keyset region 604, provided is information about the keyset. In a current keyset region 620, the name of the currently selected keyset is shown. This name can have any number of characters, but is typically a name easily remembered by the engineer or user of administrator module 450 (FIG. 4) to identify a particular keyset used to access one or more APs 412a-412n (FIG. 4).

As part of keyset region 604, a key region 622 depicts information regarding one or more keys 624, four keys illustrated in FIG. 6; however, one skilled in the art understands that each keyset can include one or more keys. The key region 622 has a group of headers 626 that identify information or data associated with each key 626. For instance, headers 626 can include a designation of the key, the type of encryption associated with the key, i.e., none, 64-bit, or 128-bit encryption, and/or an identification of the number of characters associated with the key, i.e., XX, XXXX, etc.

Each key 624 includes data related to each of the headers 626. For instance, keys 624 are depicted in numerical order from key #1 to key #4, with the designation of the particular key below the header that indicates the designation of the key. Each key 624 further includes fields or data indicative of the level of encryption associated with the key. For instance, an encryption region or field 630 enables the user to select none, 64-bit, or 128-bit encryption through clicking upon an associated interface. This region or field 630 allows the user to select one encryption level.

Another region or field is the key data region 632. This region or field 632 contains the key data, i.e., the character strings forming the key. As shown, the character strings can be separated into one or more key data sub-regions 634 that contain one or more characters of the key. Through separating the key into numerous sub-regions, an engineer or user of administrator computer 450 (FIG. 4) can more easily input and view the key data. In other configurations, a single key data region can be included in key data region 632.

To add or update the data associated with a particular keyset depicted in keyset region 604, a user or engineer can select add to list/update button 636. As with other buttons described herein, activating or selecting add to list/update button 636 causes one or more drop-down menus, pop-up windows, lists, tables, or other graphical user interface known to those skilled in the art to be presented to the user or engineer through which additions or updates to the keyset can be achieved.

Although reference is made to one exemplary GUI usable by a user or engineer to access, view, modify, update, delete, and/or create keys, keysets, and keyset profiles, various other configurations of the GUI are possible. For instance, in other configurations, a user can vocalize changes to data related to the one or more keys, keysets, and keyset profiles. In other configurations, more or less information regarding each key, keyset, and/or keyset profile can be presented to the user. Further, various data structures can be used store the information or data associated with the one or more keys, keysets, and keyset profiles. The data structure can be stored in various types of virtual, temporary, or permanent memory, whether such memory is removable or not.

Returning to FIG. 5, when administrator system or module 450, which functions as a network analyzer, is used in real time mode, the administrator need only select which keyset to use and which AP channel to monitor. The analyzer module 504 then performs all encryption/decryption tasks using the selected keyset. If numerous keysets need to be applied to the data, post capture decryption mode is used. It will be understood by those skilled in the art that GUI 600 is one of many graphical user interfaces available within the analyzer software. Additionally, the specific design of graphical user interfaces dealing with keys and keyset profiles can change without altering the scope of the present invention.

The analyzer module 504 of the invention permits the network engineer to conveniently view and manage the keys and keysets associated with APs in wireless networks. Moreover, the graphical user interfaces of administrator system 450 facilitate the process by which the network engineer groups multiple keysets associated with multiple wireless access points of a single wireless local area network into a single keyset profile. Alternatively, the graphical user interfaces of administrator system or module 450 also facilitate the process by which the network engineer groups multiple keysets associated with multiple ESSs of multiple wireless local area networks into a single keyset profile. In general, the techniques according to the invention for viewing, grouping or saving multiple keysets together as described herein significantly simplify the process of using a network analyzer in multiple wireless networks or with multiple ESSs/BSSs in a single wireless network.

To facilitate access to and retrieve the log data from access points 412a-412n (FIG. 4), administrator system or module 450 includes a wireless input/output (I/O) port 506, such as a wireless network card, whether removably or fixedly attached to administrator system or module 450. The port 506 provides the access to the wireless signals associated with access ports 412a-412n. Various wireless I/O ports are known to those skilled in the art, whether it be ports that operate under the IEEE 802.11 Wireless Ethernet standard, the 802.11 standard, the 802.11a standard, 802.11b standard, the 802.11g standard, or some other wireless standard known to those skilled in the art.

In addition to wireless I/O port 506, administrator system or module 450 includes various other hardware and/or software I/O ports, as represented by I/O port 508. For instance, I/O port 508 can be a parallel port, serial port, USB port, or other ports known to those skilled in the art.

A simple method for using the invention can be demonstrated by referring to FIGS. 4, 5, and 7. Keyset$_1$, keyset$_2$ and keyset$_N$ are generated for ESS$_1$, ESS$_2$ and ESS$_N$ respectively. These three keysets are combined into keyset profile$_A$ 70 stored in a data store accessible to an administrator system or module, such as a laptop computer, a Personal Digital Assistant (PDA), or other moveable hardware device having the analyzer module or software loaded. For instance, the data store can be disposed within a network accessible to the administrator system or module or can be loaded onto the administrator system or module. In either case, the data store may itself be encrypted to prevent unauthorized access to the keys and keysets.

Using the administrator system, a network engineer connects to any one of the available APs. Using the keyset profile$_A$ 70, the network engineer selects the correct keyset for the BSS/AP he wishes to analyze. In real time mode, the software automatically decrypts all encrypted packets passed to and from the AP, storing the decrypted data within a data store on the administrator system. Alternatively, the decrypted data can be displayed to the network engineer or other individual through a user interface, such as but not limited to, a monitor, one or more graphical displays, or other display that visually represents the decrypted data.

The decrypted packets can optionally be analyzed using any analysis methods implemented by a network analyzer known to those skilled in the art. The network engineer can then view a report that represents the results of the network analysis. Alternately, all traffic from a channel can be captured to a buffer for analysis at a later time using post capture decryption mode.

Figure 8:
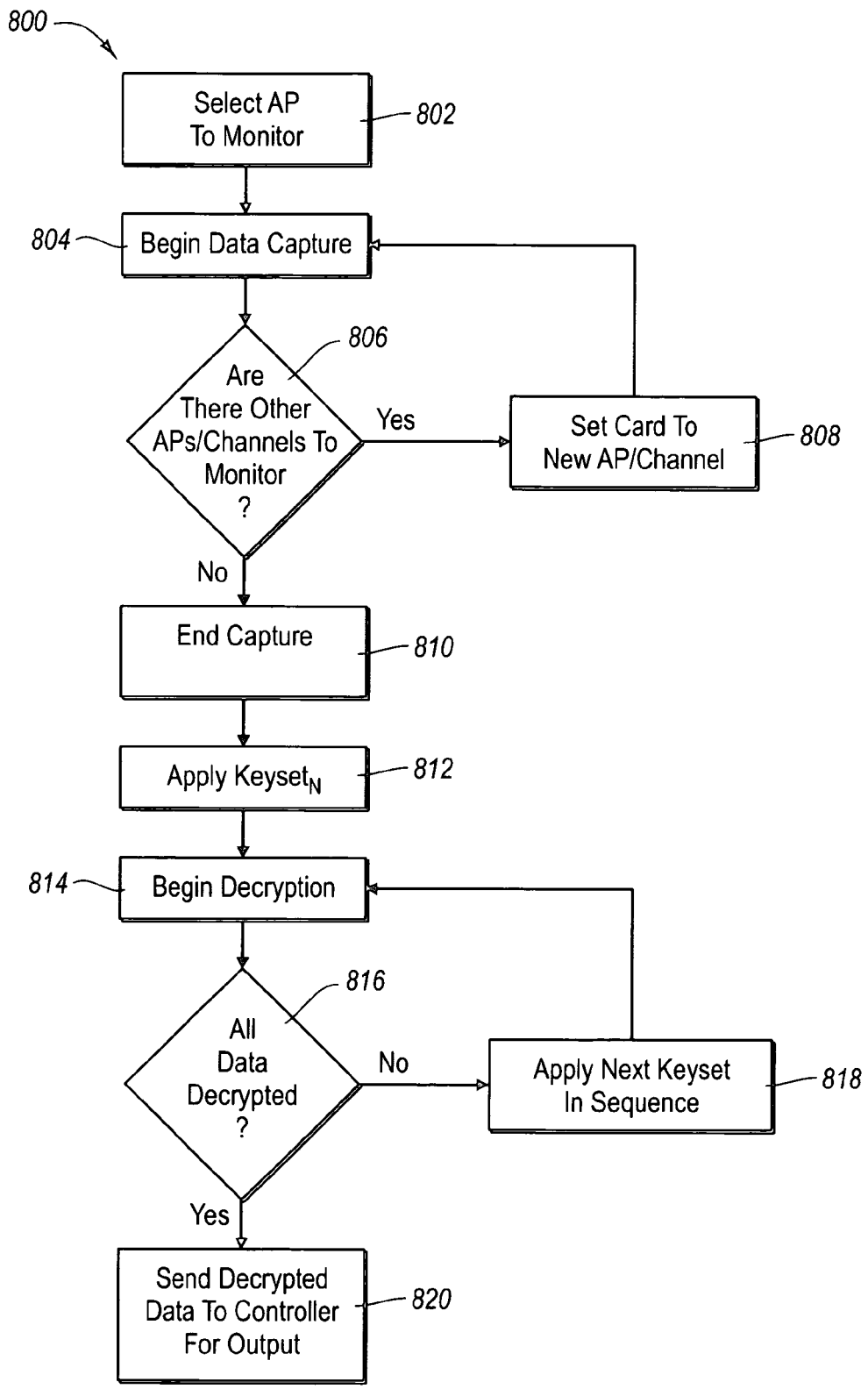
FIG. 8 shows a block diagram of one exemplary method for performing post capture decryption of captured encrypted data, according to yet another aspect of the present invention.

In post capture decryption mode, administrator system or module 450, which functions as a network analyzer, can be used to analyze data captured from multiple access points. The analyzer module 504 can interact with data store 502, control module 500, and I/O ports 506 and 508 to capture data and subsequent analyze and decrypt the captured data. FIG. 8 illustrates one method of accomplishing this task.

The method, designated generally as 800, includes selecting the AP that will be monitored by the card by selecting the channel the AP is on, as represented by block 802. If there is only one AP in the area, this can be handled automatically by the network card. However, if there are several APs in the area, the engineer can manipulate the controls of the analyzer to which AP to monitor. Following AP selection, administrator system or module 450 (FIG. 5) begins capturing data as it monitors the data passing through the AP, as represented by block 804.

In the event that there are multiple APs/channels to monitor, the engineer can designate the order in which the APs/channels are monitored and hence the data captured, as represented by blocks 806 and 808. Alternatively since the network card, even in promiscuous mode, can only capture data from one channel at a time, the engineer can manipulate administrator system or module 450 (FIG. 5) to that analyzer module 504 access one channel for a set amount of time, then change channels and accesses the next channel for a set amount of time. One time period commonly used is about ten seconds per channel. However, those skilled in the art will realize that any time period from milliseconds to hours, or even random time periods, is contemplated to be within the scope of the invention.

The administrator system or module 450 (FIG. 5) monitors the designated channel, then alternates through all of the channels for as long as necessary to capture the desired amount of data for analysis. For instance, administrator system or module 450 (FIG. 5) can capture data until a predefined quantity of data is captured; the predefined quantity being defined by a user of administrator system or module 450 (FIG. 5). Alternatively, administrator system or module 450 (FIG. 5) can capture data for a predefined time period, no matter the quantity of data captured. Again, the defined time period can be set by a user of administrator system or module 450 (FIG. 5). The defined quantity or time period can be stored in data store 502 (FIG. 5) of administrator system or module 450.

Once all channels have been monitored for the desired amount of time or until the desired quantity of data is captured, data capture is ended and the captured data can be written from the capture buffer to a file within data store 502 (FIG. 5), as represented by block 810. Alternately, or prior to storing the data within the file, the data can be kept in the capture buffer (not shown) that forms part of administrator system or module 450 (FIG. 5) for immediate decryption. One drawback to using the capture buffer instead of writing the data to a file is that, if there is a power failure or other event that interrupts the decryption process, data in the capture buffer, may be lost. Data written to the file within data store 502 (FIG. 5) will be available even if administrator module 450 is turned off and turned back on again while the decryption process is ongoing.

As the decryption process begins, the analyzer module 504 (FIG. 5) will apply one of the keysets in the selected keyset profile stored in data store 502 (FIG. 5) as represented by block 812. If data is captured from only one AP, analyzer module 504 (FIG. 5), and more generally administrator module 450 (FIG. 5) automatically applies the keyset in use by that AP. Which keyset to use, as well as which channel to use can be configured by the user.

When data from multiple APs is captured, the user of administrator module 450 (FIG. 5) can select which profile to apply to the encrypted, captured data to perform the iterative decryption steps described herein. Alternatively, analyzer module 504 (FIG. 5), or administrator system or module 450, can iteratively try each stored profile and associated keysets to decrypt the encrypted, captured data. In either case, administrator system or module 450 (FIG. 5), including analyzer module 504, applies the selected keyset in the selected profile to decrypt all of the captured data. The next step involves determining whether or not all of the data has been decrypted, as represented by block 816. Since the data came from different APs, it may have been encrypted using different keysets. When a packet contains encrypted data, it is so flagged. In each iteration of the decryption process, the software will only clear the flags for those packets whose data was decrypted successfully.

As discussed previously, one advantage to post capture decryption is that multiple keysets can be applied to the same capture buffer or data file until all of the data has been decrypted. Post capture mode allows administrator system or module 450 (FIG. 5) to iteratively apply each of the keysets in a particular keyset profile sequentially, until all of the data has been decrypted, as represented by block 818. Alternately, the user can set the order in which the keys/keysets are applied until all of the data has been decrypted. Once all of the data has been decrypted, the data is sent to the control module for output to a GUI that is part of administrator module 450 (FIG. 5). All of the options discussed above can be set and performed using a GUI that is part of administrator module 450 (FIG. 5) described herein.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network analyzer for use in a computer network having wireless components providing encrypted data transmission and having at least two wireless access points with different encryption keysets, said network analyzer comprising:
    at least one wireless card adapted to receive encrypted data on one or more channels that said at least two wireless access points are using;
    a single keyset profile stored in a data store, said single keyset profile having a plurality of encryption keysets, each encryption keyset being used to decrypt encrypted data received from a different access point of said at least two wireless access points; and
    an analyzer adapted to decrypt said encrypted data received by said at least one wireless card by using each of said plurality of encryption keysets in sequence until all of said encrypted data has been decrypted.

2. The network analyzer of claim 1, wherein said encrypted data is stored in non-volatile memory before said data is decrypted.

3. The network analyzer of claim 1, wherein each access point of said at least two access points utilizes a unique keyset, wherein said profile contains each unique keyset.

4. The network analyzer of claim 1, wherein said single keyset profile comprises a plurality of encryption keysets with each encryption keyset comprising at least two keys.

5. The network analyzer of claim 1, wherein each of said access points operates on a different AP channel.

6. The network analyzer of claim 5, wherein said at least one wireless card receives encrypted data from each of said access point channels for a predefined period of time.

7. The network analyzer of claim 1, wherein said at least one wireless card alternately receives encrypted data from each of said access points until said at least one wireless card receives a defined quantity of encrypted data from each of said access points.

8. The network analyzer of claim 1, wherein said data store is non-volatile memory.

9. The network analyzer of claim 8, wherein said encrypted data is stored in a data buffer before being stored in said data store.

10. The network analyzer of claim 1, wherein each of said keysets uses at least 64 bit encryption.

11. The network analyzer of claim 1, wherein each of said keysets uses at least 128 bit encryption.

12. The network analyzer of claim 1, wherein said profile is stored internally in the network analyzer.

13. The network analyzer of claim 12, wherein said profile is encrypted.

14. In a computer network having wireless components providing encrypted data transmission and receipt and comprising at least two wireless access points, said network having a different encryption keyset for each of said at least two access points, said computer network further comprising at least one computer being connected to said network by a wireless network card and having an analyzer module, a method for decrypting data captured by said wireless network card from at least one of said at least two access points, said method comprising:
    a step for establishing a keyset profile accessible by the analyzer module, said keyset profile having all keysets being used by any of said at least two access points;
    a step for receiving encrypted data from at least one of said at least two access points and saving said encrypted data to a data store; and
    a step for decrypting said data in said data store using said keyset profile.

15. The method of claim 14, wherein said step for saving said encrypted data further includes a step of saving said encrypted data to a data buffer before saving said data in said data store.

16. The method of claim 14, further comprising a step for analyzing said decrypted data to identify any encrypted data.

17. The method of claim 14, wherein the step for decrypting said data includes decrypting said data using a first keyset associated with said keyset profile and decrypting said encrypted data using a second keyset associated with said keyset profile.

18. The method of claim 17, further comprising a step for repeatedly analyzing and decrypting said encrypted data until said encrypted data is completely decrypted.

19. The method of claim 18, wherein said step for repeatedly analyzing and decrypting is performed without input from a user of said analyzer module.

20. The method of claim 14, further comprising a step for selecting said keyset profile for said at least two wireless access points.

21. The method of claim 14, further comprising a step for accessing said keyset profile at a location of said computer network remote from said analyzer module.

22. The method of claim 21, wherein said keyset profile is stored in an encrypted form and further comprising a step for decrypting said keyset profile and storing a decrypted version of said keyset profile local to said analyzer module.

23. The method of claim 14, further comprising a step for displaying said decrypted data through at least one user interface.

24. An administrator system for use in a wireless computer network having a plurality of wireless access points that use different encryption keysets, the administrator system comprising:
    a wireless card capable of receiving encrypted data from one or more channels of said plurality of wireless access points;
    a data store that stores the different encryption keysets in a single keyset profile; and
    an analyzer electrically connected to said wireless card and said data storage, said network analyzer capable of decrypting said encrypted data captured from said one or more channels of said plurality of access points by said wireless network card, wherein said keyset profile is used to decrypt all of said captured encrypted data received from said plurality of wireless access points,
    wherein said analyzer decrypts said captured data by applying each unique keyset in sequence until all of said encrypted data has been decrypted.

25. The administrator system of claim 24, wherein said captured encrypted data is stored in said data store.

26. The administrator system of claim 24, wherein said captured encrypted data is stored in a data buffer before said encrypted data is stored in said data store.

27. The administrator system of claim 26, wherein said captured encrypted data in said data buffer is written to said data store prior to being decrypted.

28. The administrator system of claim 27, wherein a user selects an order for said keysets to be used to decrypt said captured data.

29. The administrator system of claim 24, wherein each access point has a keyset that encrypts data to and from at least one user and said access points, said keyset profile containing said keyset to each of said plurality of access points.

30. The administrator system of claim 29, wherein each access point utilizes a unique keyset, and wherein said keyset profile contains each unique keyset.

31. The administrator system of claim 29, wherein said keyset for each access point utilizes at least two keys, and wherein said keyset profile contains each of said keysets.

32. The administrator system of claim 24, wherein each of said access points operates on a different AP channel.

33. The administrator system of claim 24, wherein said analyzer records said data on each of said access point channels for a predefined period of time.

34. The administrator system of claim 33, wherein said analyzer rotates sequentially through all of said access point channels in a continuing loop.

35. The administrator system of claim 34, wherein said period of time is approximately ten seconds.

36. The administrator system of claim 24, wherein each of said keysets uses at least 64 bit encryption.

37. The administrator system of claim 24, wherein each of said keysets uses at least 128 bit encryption.

38. The administrator system of claim 24, wherein said data store is volatile memory.

39. The administrator system of claim 24, wherein said data store is remote from said analyzer.

40. The administrator system of claim 39, wherein said keyset profile is stored in an encrypted form.

* * * * *